United States Patent Office 3,472,331
Patented Oct. 14, 1969

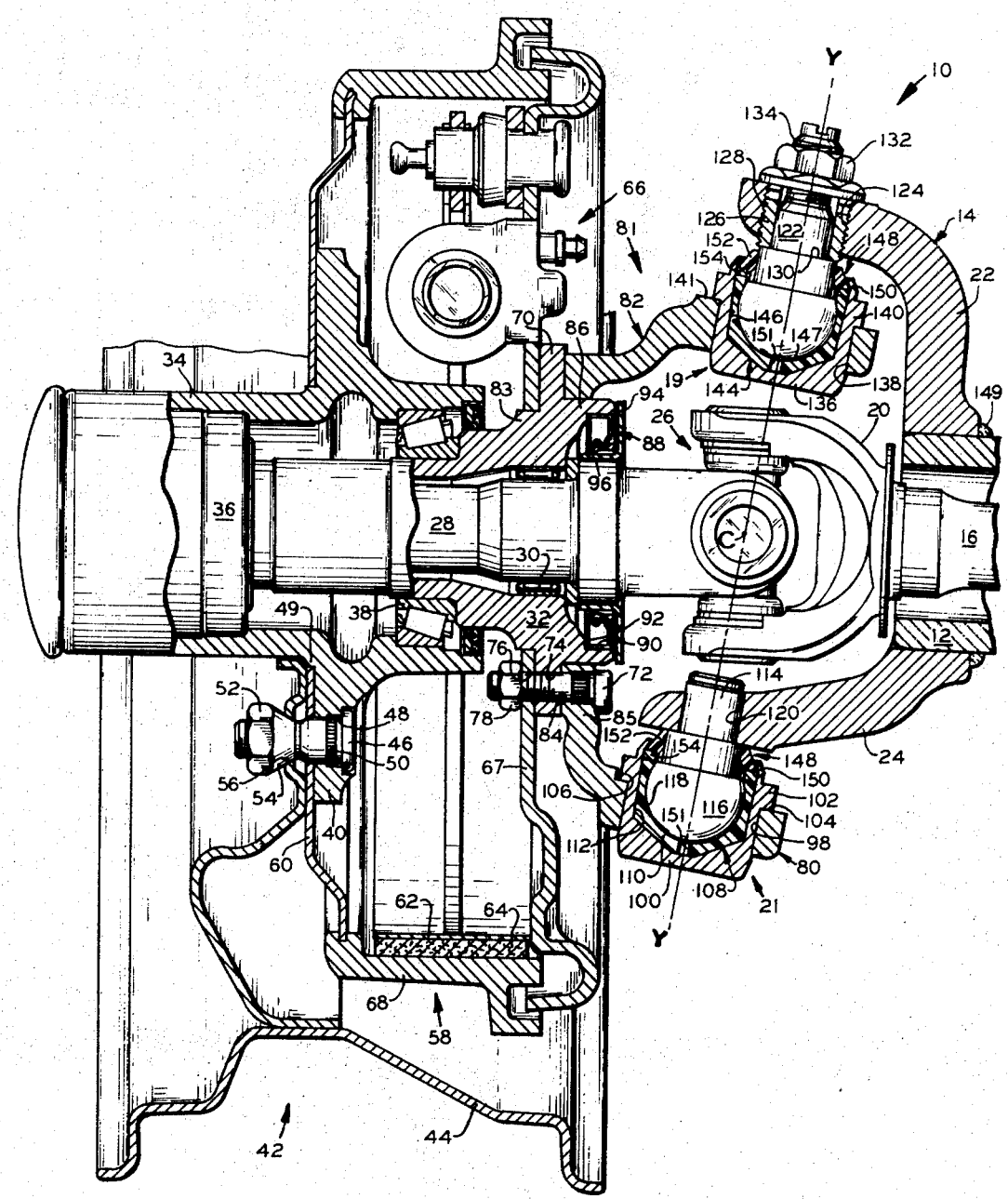

3,472,331
STEERING DRIVE AXLE ASSEMBLY
Patrick W. Baker, Toledo, Ohio, and Thomas M. Kessler, Fort Wayne, Ind., assignors to Dana Corporation, Toledo, Ohio, a corporation of Virginia
Filed Feb. 20, 1968, Ser. No. 706,943
Int. Cl. B62d 7/00; B60k 17/30; F16c 11/06
U.S. Cl. 180—43                    6 Claims

ABSTRACT OF THE DISCLOSURE

This invention is intended for use in the environment of a front steering drive axle assembly having a driver axle rotatably supported in an axle housing and a driven axle rotatably supported in a wheel hub in outgoing and spaced relation to said driver axle and in axial alignment therewith. A Cardan-type universal joint connects the axles together while improved pivot means is provided for mounting the driven axle for horizontal movement with respect to the driver axle. This pivot means comprises a yoke arm arrangement which insures substantially equal loading to both the upper and lower yoke and bracket arms and a resilient deformable dampening and bearing means disposed between the king pin bearings and the yoke arms to suppress vibration and provide anti-shimmy characteristics to the steering drive axle assembly.

---

This invention relates to a steering drive or non-drive axle assembly and is more particularly directed to such an assembly having the function of steering control, handling and carrying the radial and thrust forces involved. It is provided with an improved trunnion arrangement to insure substantially equal loading between the upper and lower yoke supporting arms and an improved resiliently and deformably mounted king pin bearing assembly means for vibration isolation, vibration suppression and the prevention of shimmy.

Steering drive axles similar to that used in this invention are well known as exemplified, for example, by United States Patents 2,781,211, 2,871,695, 3,253,670 and 3,295,624. In the type of assembly illustrated in the first two of these patents the drive axle housing and wheel hub are joined through means of the king pin assembly to facilitate steering and the driver and driven axles are joined by universal type joints. The king pin assemblies include cylindrical shaped portions disposed in vertically spaced relationship with sleeve and tubular bearing elements such as sleeves and ball bearings to carry the load. Vertical loading of the chassis is imparted primarily to the lower kind pin assembly so that the lower yoke arm is provided with a thrust bearing. In these arrangements no uniform distribution of the load is provided for so that each of the yoke arms cannot carry approximately half the load and, further, only minor dampening, if any, is obtained to eliminate vibration and shimmy.

The next of these arrangements (U.S. Patent 3,253,670), typically, provides for distribution of loading between the yoke arms but no provision is made for anti-shimmy and the area of the bearing surfaces provided for the king pin assemblies is not uniform so that actual, equal loading on the area of the bearing surfaces for the yoke arms is not obtained. The loading, therefore, would become unequally distributed between the two yoke arms and no vibration isolation or anti-shimmy characteristics are provided by the assembly.

In the fourth of these axle arrangements (U.S. Patent 3,295,624), there is disclosed therein an indication that the yoke arms bear substantially equal loading but there are no positive anti-shimmy characteristics provided in the assembly and it is somewhat complex in structure in comparison to the instant invention.

It is, therefore, an object of the present invention to provide an improved yoke arm arrangement and structure to insure substantially equal load distribution between the load bearing members so that the yoke arms of the suspension yoke may be fairly uniform in cross sectional area and the bearing loads to the king pin assemblies equally distributed to their bearing surfaces.

It is an additional object of the invention to provide a steering drive axle assembly wherein resilient, deformable, low friction bearing elements are utilized for bearing disposition of the king pin assemblies to reduce and isolate vibration and eliminate shimmy.

It is an additional advantage of this invention to provide a uniform load bearing structure for the steering drive axle assembly which also results in a resilient mounting of the king pin assemblies and therefore anti-shimmy and vibration suppression and isolation characteristics.

It is a still further object of the invention to provide an improved steering drive axle assembly which is easily and inexpensively manufactured and provides a reduction in vibrations and shimmy imparted to the vehicular chassis.

Other and further objects of this invention and its details will be apparent to those skilled in the art from the following detailed description of the appendant drawing. It will, of course, be understood by reference to the accompanying drawing, that it is offered only as an illustration of a preferred embodiment of the invention and what is considered to be the best mode of applying the above principles.

In the preferred form of the invention a steering drive axle assembly is provided wherein a driver axle is rotatably supported in an axle housing and a driven axle is rotatably supported in a wheel bearing spindle in radially outwardly and spaced relation to the driver axle, this driven axle shaft being in substantially axial alignment with the driver axle. A Cardan-type universal joint connects the driving and driven axles together so as to provide a universal driving connection therebetween in a well known manner. A suspension yoke secured to the axle housing has its yoke arms extending above and below the universal joint so as to be in substantially encompassing relationship therewith. A pair of ball and socket assemblies, one extending outwardly and downwardly from the upper yoke arm and one extending outwardly and downwardly from the lower loke arm are disposed on an axis which extends angularly (it should, of course, be understood that these axes may be parallel and/or coincident) relative to the axis of the driver and driven axles and intersects the center of rotation of the Cardan-type universal joint. A pair of bracket arms extending from the wheel spindle are disposed immediately below the upper and lower yoke arms so as to mount the socket portion of the ball and socket bearing assembly combination. The ball portion of the king pin bearings are compressingly disposed within the socket portion so as to enage against liners made of resilient, deformable low friction plastic-like material provided with high vibration dampening characteristics. The bracket arms attached to the wheel spindle, because of their particular positioning below the upper and lower yoke arms, provide that the loading of the chassis is substantially equally split between the upper and lower yoke arms and also provide for a loading effect on the king pin bearing assemblies to insure proper contact between their mating parts. Thus, positive, and substantially equal bearing is provided between the resilient deformable plastic liners and the ball portions of the king pin assemblies.

In the drawing, the illustrated figure represents a side view partly in section, of the steering drive axle assembly of the instant invention.

Referring now more specifically to the drawing, a steering drive axle assembly 10 is shown therein including an axle housing 12 secured to a suspension yoke 14 through both of which extends a shaft extension 16 of the driving axle. Although not illustrated, it is to be understood that the driving axle and axle housing 12 extend into engagement with a differential housing and drive gear arrangement of conventional character and that a mirror image of the described steering drive axle assembly is disposed on the other side of the differential housing and drive gear arrangement to steeringly mount the opposite vehicular wheel. The driving axle, as indicated above, is integral with the shaft extension 16 so as to be non-rotationally connected thereto in order that the shaft extension 16 is driven by the driving axle. This shaft extension forms an integral portion of an axle shaft universal joint yoke 20 which extends into the axle housing 12 and between a pair of upper and lower yoke arms 22 and 24 of the suspension yoke or axle tube yoke 14. Thus, a universal joint 26 of which the axle shaft universal joint yoke 20 forms a part is disposed between the yoke arms 22 and 24 for easy connection to a driven axle shaft 28. As illustrated, this shaft is rotationally supported by bearings 30 disposed in a wheel bearing spindle 32 which is mounted radially outwardly in spaced relation to the driven axle shaft 28. The universal joint 26 is of conventional character and a more detailed description of it may be found, for example, in U.S. Patent 3,178,907. It is sufficient for the purposes of this invention to state that it serves as a universal connection for the transmission of power flow between the driving axle shaft extension 16 and the driven axle 28.

A wheel hub 34 as is generally conventional in the art is bearingly mounted on the wheel bearing spindle 32 by a set of tapered roller bearings 36 and 38 so that the wheels of the vehicle may be free wheeled, if desired, or locked into driving engagement with the driven shaft axle 28. The wheel hub 34 is more thoroughly described in U.S. Patent 3,124,377, it being sufficient for the purpose of this application to indicate that this hub is either manually engaged or disengaged to provide free wheeling or front wheel vehicular drive. Reference may be made to the patent referred to for a more detailed description of this particular facet of the steering drive axle assembly 10.

Attached to the wheel hub 34 by an integral flange 40 which extends annularly around the periphery of the hub and radially outwardly therefrom is a wheel rim assembly means 42. The wheel rim assembly means 42 includes a rim attaching portion 44 to which is mounted the vehicular tire (not shown) in a conventional manner. The wheel rim assembly means 42 is mounted rigid with the flange 40 of the wheel hub 34 by means of a series of bolts 46 (only one shown), each of which extends through a countersunk bore 48 extending axially through the flange 40, the said bolt 46 having an enlarged serrated portion 50 so as to resist rotational movement once press fit inserted in the bore 48. A nut 52 having an inwardly tapered portion 54 extends into a similarly shaped tapered bore 56 in the wheel rim assembly means 42 to threadingly engage with the bolt 46.

To complete the assemblage to the wheel hub 34 at the location of the flange 40 of the hub 34, a brake assembly 58 having an extending portion 60 of platelike configuration is disposed between the wheel rim assembly means 42 and the flange 40 of the wheel hub 34. The extending portion 60 of the brake assembly 58 is also attached to the flange 40 by means of the bolts 46. By this arrangement provision is made in the steering drive axle assembly 10 for an attachment means for the tire of the vehicle (not shown) and for the brake assembly and its included parts. An annularly extending shoulder 49 on the wheel hub 34 helps to rigidify this assembly.

The active operating portion of the brake assembly 58 includes a circumferentially extending first rim portion 62 that forms the acting part of the brake assembly 58 since it carries a friction brake material 64 fixedly attached thereto for selective engagement with the previously described portion of the brake assembly 58. The friction brake material 64 and first rim portion 62, as is conventional, is capable of expansive movement for selective engagement through the aegis of a hydraulic cylinder means 66 to thereby frictionally impinge upon the internal periphery of a second rim portion 68 of the brake assembly 58 attached to and extending axially from the portion 60 that, as previously described, is attached to the wheel hub 34. In order to complete the brake assembly 58 a plate like member or brake backing plate 67 is attached to the wheel bearing spindle 32 by a radially and circumferentially extending flange 70 mounted integral with the wheel bearing spindle 32. A series of bolts 72 (only one shown) are each inserted through a pair of bores 74 and 76 extending axially through the flange 70 and the brake backing plate 67, respectively, with each bolt 72 having a nut 78 provided thereon for assembling the wheel bearing spindle and brake backing plate together. A shoulder 83 extending annularly on the wheel bearing spindle 32 aids in rigidifying the assembly of the brake backing plate 67 to the wheel bearing spindle 32.

A pair of bracket arms 80 and 82, formed by a wheel yoke or wheel spindle knuckle 81, extend axially towards the driving axle shaft extension 16 and are fixed for rotation with the wheel bearing spindle 32. These bracket arms provide for seating of a pair of king pin bearings assemblies 19 and 21, respectively, for pivotal attachment of the wheel bearing spindle 32 to the axle housing 12. The wheel yoke 81 is generally annular in cross section with an axially extending lug forming the bracket arm 80 so that it extends generally below and axially inwardly away from the wheel bearing spindle 32 to thereby provide a lower bracket arm. At the same time, the bracket arm 82 is formed by another axially extending lug on the wheel yoke 81 which extends generally above and inwardly away from the wheel bearing spindle 32 to thereby provide an upper bracket arm. The wheel yoke 81 is fixed for rotational movement with the wheel bearing spindle 32 by the series of bolts 72, previously mentioned, extending through a bore 84 formed in a flange 85 in the wheel yoke 81. These bolts thereby removably fasten the wheel yoke 81, wheel bearing spindle 32 and a portion of brake assembly 58 in assembled relation. A shoulder 86 on the wheel bearing spindle adds rigidity to the structure.

Means is provided to seal the right-hand end of the wheel bearing spindle 32 against the intrusion of dirt and dust and for the retention of lubricant. This means comprises an oil seal 88 which is press fit into an axially extending bore 90 which terminates at the axially inner face of the wheel bearing spindle 32. A shoulder 92, formed by a reduced portion of the bore 90, provides for abutment of the oil seal 88. To provide additional protection for the bearing spindle 32, a dust shield 94 of generally cylindrical shape in end view and L-shape in cross section is press fit on a portion of the driven shaft 28 so as to be interposed between it and the oil seal 88. A slight interference fit is provided between an axially extending leg 96 of the L-shape of the dust shield 94 and the inner diameter of the oil seal 88 so that a wearing and bearing surface is provided between the leg 96 and internal circumference of the oil seal 88. By this structural arrangement a substantially oil and dust free environment is provided at the rightward end of the wheel bearing spindle 32, with the wheel hub 34, of course, providing sealing for the opposite end of the wheel bearing spindle.

The lower bracket arm 80, of the wheel yoke 81, includes a bore 98 extending angularly to the vertical on an axis Y—Y which is offset from the centerline of the vehicle wheel. It is to be understood that these axes can be parallel and coincidental. Within the bore 98 is mounted a bearing cup 100, the said cup having an annular shoulder 102 which provides a face 104 which, in turn, abuts downwardly against a counterbore faced portion 106 formed on the bracket member 80. The bore 98 is of such a dimension that the bearing cup 100 may be press fit therein so that a rigid assembly of the bearing cup and bracket member is achieved.

Mounted within the bearing cup 100 is a bearing seat member 108 formed of a resilient, deformable and antifriction plastic like material such as a high density linear polyethylene or the like. Its shape is annular in cross section, tapering slightly inwardly from top to bottom with a generally conical end portion 110 so as to fit in and compressingly abut the surfaces of a bore 112 of similar shape formed in the bearing cup 100. A king pin or ball stud 114 having a generally spherical portion 116 extends into the bearing cup 100 to seat and bear against a bearing seat 118 which conforms thereto and is formed in the bearing seat member 108.

The king pin 114 is mounted so as to extend into a bore 120 formed in the lower yoke arm 24 by being press fit therein to provide a rigid assembly between it and the lower yoke arm. The bore 120 extends at an angle relative to the vertical and has as its axis the line Y—Y which extends through a center C, serving as the center of rotation of the universal joint 26. This axis also conforms to the axis of the bore 112 of the bearing cup 100. Thus, rotation of the king pin 114 is around the same center of rotation as the universal joint 26.

The axis Y—Y, extended upwardly, passes through the axis center of an upper king pin 122 that is mounted in a downwardly depending relation to the upper yoke arm 22 by a somewaht different structure than the lower king pin 114. More specifically, a bore 124 in the upper yoke arm 22 is threaded for receipt of a bushing 126, the said bushing having threads 128 engaged with the threads in the bore 124. The bushing 126 is of sufficient length to extend from a shouldered portion 130 on the king pin 122 and almost through the bore 124. A nut 132 which is screwed on a threaded portion 134 of the king pin 122 pulls the assemblage of the king pin 122, bushing 126 and upper yoke arm 22 tightly together. By this arrangement the nut 132 draws the king pin 122 up tight against the bushing 126 within the yoke arm 22 so as to rigidify its assembly to the yoke arm. The bushing 126 may, thus, be adjusted upwardly or downwardly within the bore 124 to provide the proper dimension between upper and lower king pins and thereby absorb manufacturing tolerances of the other related parts and help insure that loading is split substantially equally between the yoke arms of the suspension arrangement.

A bearing cup 136 is press fit into a bore 138 formed in the upper bracket arm 82 and is held against this bracket arm by an annular shoulder portion 140 of it abutting downwardly against a faced portion 141 of upper bracket arm 82. A bearing seat member 144, similar in shape to the bearing seat member 108 provided in the bearing cup 100, seats in a tapered and conical shaped bore 146 in the bearing cup 136. Said bearing seat member is also of a deformable, resilient plastic like material of high density linear polyethylene or the like and provides a bearing and seating surface 147 similar in shape to the bearing surface of the bearing seat 118.

Each of the king pin bearing assemblies 19, 21 is sealed against the intrusion of dirt and dust by a sealing means 148. In the structure illustrated, an inturned, rolled lip 150 on each of the bearing cups 100 and 136 extends circumferentially, upwardly and inwardly from the upper periphery of the bearing cups to provide for reception of a pair of sealing members 152, 152. Each sealing member 152 is of an elastomeric material and extends around its respective king pin to seal its respective king pin bearing assembly from undesirable atmospheric conditions such as dirt and dust. Sealing member 152 may be of any conventional material such as leather, plastic, rubber, or the like.

Assembly of one of the king pin bearing assemblies during manufacturing is accomplished in the following manner, the assembly of the king pin bearing assembly 21 being the one selected for descriptive purposes. The king pin 114 is first pressed into the bearing seat member 108 which is then insertingly placed in the bearing cup 100. Because of the taper of the bore 112 of the bearing cup 100 and the slight oversize of the bearing seat member 108 a force fit is provided therebetween to obtain a compressive force on the spherical portion 116 of the king pin 114. A bore 151 in the bearing seat member 108 provides for the escape of any entrapped air (this bore also serves as a reservoir for lubricant during operation). To insure that a compressive force is maintained on the bearing seat member 108, the sealing means 148 is placed in the bore 112 and the inturned lip 150 formed by turning. It should be noted, at this time, that the sealing means 148 includes a steel ring member 154 which is bonded to the sealing member 152, this steel ring member providing sufficient rigidity to the sealing means 148 in conjunction with the inturned lip 150 to insure proper compression of the bearing seat member 108. Thus, in operation, the predeformed resilient material which constitutes the bearing seat member 108 bears compressingly and substantially uniformly against the spherical surface of the king pin bearing 114 to insure equal load distribution and to absorb vibration and shimmy and prevent its transmission to the chassis of the vehicle.

The remainder of the assembly of the wheel axle assembly 10 is generally assembled conventionally, however one additional assembly operation will be described which provides an important advantage to the instant invention. Suspension yoke 14 is assembled on the axle housing 12 in the following manner. This yoke is press fit on the axle housing and a weldment 149, disposed inboard of the suspension yoke 14, is applied between the periphery of the inboard end of the suspension yoke and the axle housing 12 to rigidly mount the suspension yoke to the axle housing. By this arrangement, loading normally imparted to the suspension yoke 14 by loading on the vehicle wheel is partially reduced by the press fit between it and the axle housing 12 so that the weldment 149 need not take the entire loading imposed at the vehicular wheel. Thus, the stress riser inherently provided by the weldment 149 is partially compensated for by placing this weldment inboard of the press fit between the suspension yoke and axle housing thereby strengthening this assemblage.

It should be clear from the above description that a front drive wheel axle assembly has been described which fulfills the objects of the invention and has all the attendant advantages thereof. However, it is to be understood that the specific construction described is only exemplary, for example, the axle could be utilized as a rear axle or minor modifications could be made to the assembly described as would obviously occur to one skilled in the art.

What is claimed is:

1. A steering drive axle assembly having (a) a driver axle rotatably supported in an axle housing, (b) a driven axle rotatably supported in a wheel spindle in outboard and spaced relation to said driver axle and substantially in axial alignment therewith, (c) a universal joint connecting said axles together, (d) a suspension yoke including upper and lower yoke arms extending above and below said universal joint, (e) a wheel yoke attached to said wheel spindle and including upper and lower yoke arms, (f) said upper suspension yoke arm being disposed above said upper wheel yoke arm, (g) said lower suspension yoke arm being disposed above said lower wheel yoke arm, (h) king pin bearing means extending between and pivotally connecting said upper suspension yoke arm and said upper wheel yoke arm, (i) king pin bearing means extending between and pivotally connecting said lower suspension yoke arm and said lower wheel yoke arm, (j) each of said king pin bearing means comprising, (1) a bearing cup member disposed in one of said wheel yoke arms, (2) a bearing seating member of deformable, resilient plastic like material disposed in each of said bearing cups, (3) a king pin including a spherical portion depending from each of said suspension yoke arms and bearingly recessed in each of said bearing seating members in compressing relation therewith, (k) whereby each of said wheel yoke arms received substantially one half of chassis loading and said drive axle assembly has vibration dampening and anti-shimmy characteristics.

2. The combination set out in claim 1 wherein the deformable, resilient plastic like material is a high density linear polyethylene.

3. The combination set out in claim 2 wherein (a) each of said bearing cups is provided with an inturned lip, (b) sealing means are held by said inturned lip and bear against said deformable plastic material, (c) said sealing means comprising a metallic ring bonded to a deformable, elastomeric material.

4. The combination set out in claim 1 wherein said suspension yoke is press fit on an axle housing for said driver axle and a weldment disposed inboard of said suspension yoke fixedly attaches said suspension yoke to said axle housing whereby only a portion of the outboard load imposed on the suspension yoke is carried by said weldment.

5. The combination set out in claim 1 wherein a bushing member is threadingly received in a bore in said upper yoke arm of said suspension yoke to adjustably mount its respective king pin.

6. In a steering drive axle assembly having (a) a driving axle rotatably supported in an axle housing, (b) a driven axle rotatably supported in a wheel spindle in outboard and spaced relation to said driving axle and in axial alignment therewith, (c) a Cardan-type universal joint connecting said axles together, (d) a suspension yoke having upper and lower arms extending axially towards said driven axle above and below said universal joint, (e) a wheel yoke attached to said wheel spindle and having upper and lower yoke arms extending axially towards said upper and said lower arms on said suspension yoke, (f) said upper suspension yoke arm being disposed above said upper wheel yoke arm, (g) said lower suspension yoke arm being disposed above said lower wheel yoke arm, (h) a bearing cup member pressengly inserted in a bore in each of said wheel yoke arms, (i) a bearing seat member of deformable, resilient plastic like material disposed in a tapered bore formed in each of said bearing cups, (j) said bearing seat member including a seating face of substantially spherical configuration, (k) a king pin including a spherical portion depending from each of said upper and lower yoke arms of said suspension yoke, each bearingly and precompressingly received in one of said bearing seating members, (l) an inturned lip on each of said bearing cup members and (m) a seal compressed between said inturned lip and said bearing seating members to insure formation of a continuous bearing area between said spherical portion of said king pin and said seating face of said bearing seating member.

References Cited

UNITED STATES PATENTS

| | | | |
|---|---|---|---|
| 1,850,921 | 3/1932 | Ghiselli | 180—43 |
| 1,999,394 | 4/1935 | Burnett | 280—96.1 |
| 2,071,714 | 2/1937 | Van Ranst. | |
| 2,338,224 | 1/1944 | Ash | 280—96.1 |
| 2,580,383 | 1/1952 | Frank | 280—96.1 |
| 2,631,865 | 3/1953 | Hoffman | 280—96.1 |
| 3,288,485 | 11/1966 | White et al. | 280—96.1 |

FOREIGN PATENTS

| | | |
|---|---|---|
| 46,111 | 2/1909 | Switzerland. |

A. HARRY LEVY, Primary Examiner

U.S. Cl. X.R.

280—96.1; 287—87